US008653362B2

(12) United States Patent
Tsujishita

(10) Patent No.: US 8,653,362 B2
(45) Date of Patent: Feb. 18, 2014

(54) COVER OPENING AND CLOSING MECHANISM AND IMAGE PROCESSING DEVICE

(75) Inventor: Yoji Tsujishita, Aichi (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 483 days.

(21) Appl. No.: 13/074,049

(22) Filed: Mar. 29, 2011

(65) Prior Publication Data

US 2011/0267657 A1  Nov. 3, 2011

(30) Foreign Application Priority Data

Apr. 28, 2010  (JP) ................... 2010-103811

(51) Int. Cl.
*H05K 5/00* (2006.01)
*H04N 1/23* (2006.01)
*A47B 96/00* (2006.01)

(52) U.S. Cl.
USPC ............. 174/50; 174/559; 174/520; 399/107; 399/110; 312/326; 358/296

(58) Field of Classification Search
USPC ........ 174/50, 520, 559, 66, 67; 361/726, 725, 361/727, 724, 679.01, 600; 379/107, 11, 379/110, 124, 125, 152; 292/137, 175, 145, 292/341.14, 341.15, DIG. 11, 49, 95, 194; 358/296; 312/326
See application file for complete search history.

(56) References Cited

U.S. PATENT DOCUMENTS 5,285,240 A * 2/1994 Kinoshita et al. ............. 399/110
7,266,327 B2 * 9/2007 Mori et al. .................... 399/111
7,330,679 B2 * 2/2008 Kweon .......................... 399/111
7,474,863 B2 * 1/2009 Kaiga ............................ 399/111
7,653,328 B2   1/2010 Igarashi et al.
8,010,013 B2 * 8/2011 Tomatsu ....................... 399/110
8,160,472 B2   4/2012 Tomatsu (Continued)

FOREIGN PATENT DOCUMENTS

CN   101114143 A    1/2008
CN   101609296 A   12/2009

(Continued)

OTHER PUBLICATIONS

Notification of Reasons for Rejection for Japanese patent application No. 2010-103811 mailed Apr. 3, 2012.

(Continued)

*Primary Examiner* — Angel R Estrada
(74) *Attorney, Agent, or Firm* — Banner & Witcoff, Ltd.

(57) ABSTRACT

A cover opening/closing mechanism, including a housing having an opening; a flexible cover movable between a closed position and an opened position; a first locking mechanism; and a second locking mechanism, wherein a first distance by which a pair of members of the first locking mechanism slide and move with respect to each other in order to bring the first locking mechanism to a locked state is longer than a second distance by which a pair of members of the second locking mechanism slide with respect to each other in order to bring the second locking mechanism to a locked state. An external force for causing the pair of the members of the first locking mechanism to slide and move with respect to each other is weaker than an external force for causing the pair of members of the second locking mechanism to slide with respect to each other.

16 Claims, 10 Drawing Sheets

(56) References Cited

U.S. PATENT DOCUMENTS

2008/0025001 A1    1/2008   Igarashi et al.
2009/0317126 A1   12/2009   Tomatsu
2010/0003050 A1    1/2010   Minaminaka

FOREIGN PATENT DOCUMENTS

| JP | 2000-079739 | | 3/2000 |
|---|---|---|---|
| JP | 2006-030219 | | 2/2006 |
| JP | 2006-137110 | A | 6/2006 |
| JP | 2009271408 | A | 11/2009 |

OTHER PUBLICATIONS

The First Office Action issued in corresponding Chinese Patent Application No. 201110093461.4 dated Jun. 13, 2013.

* cited by examiner

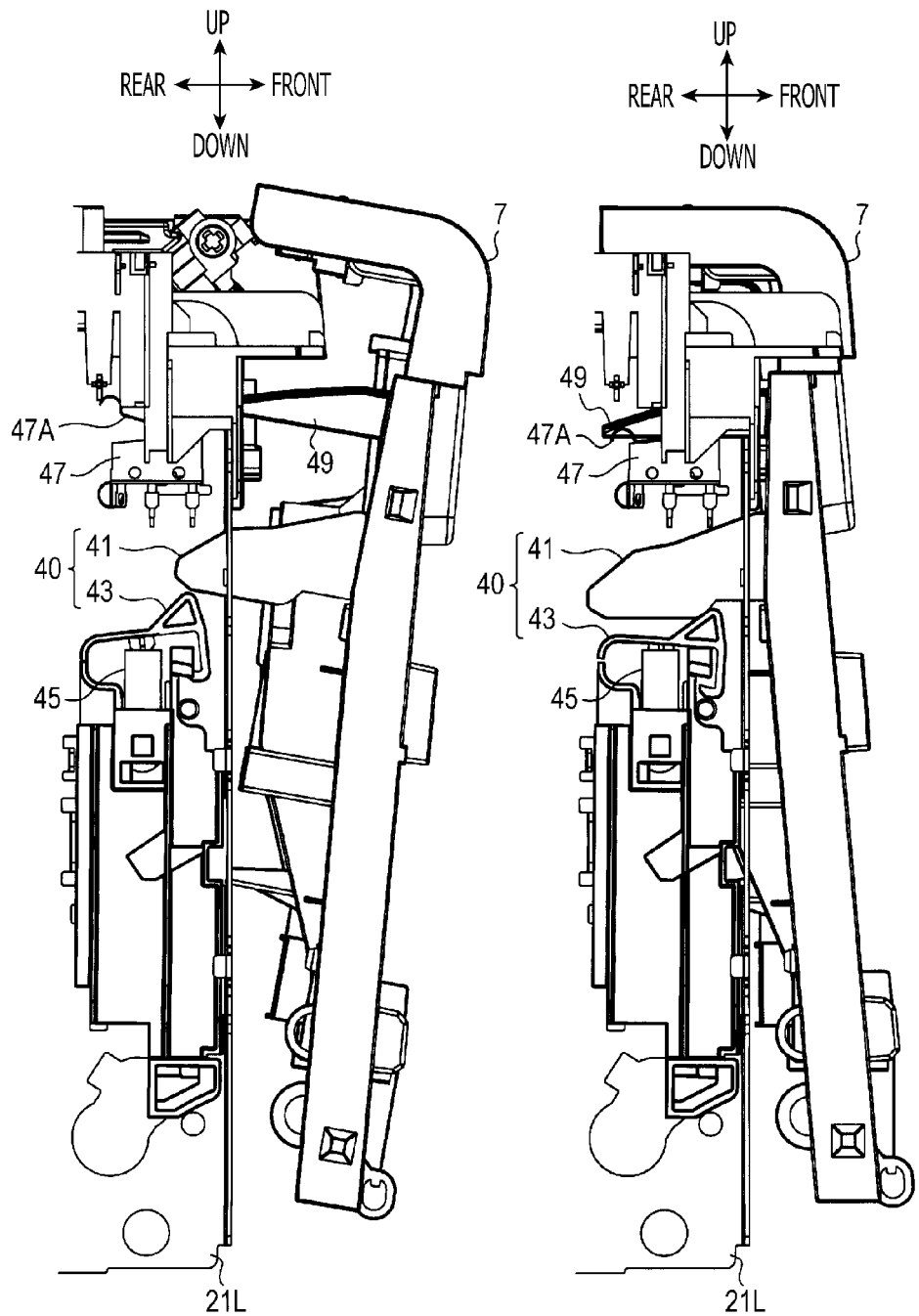

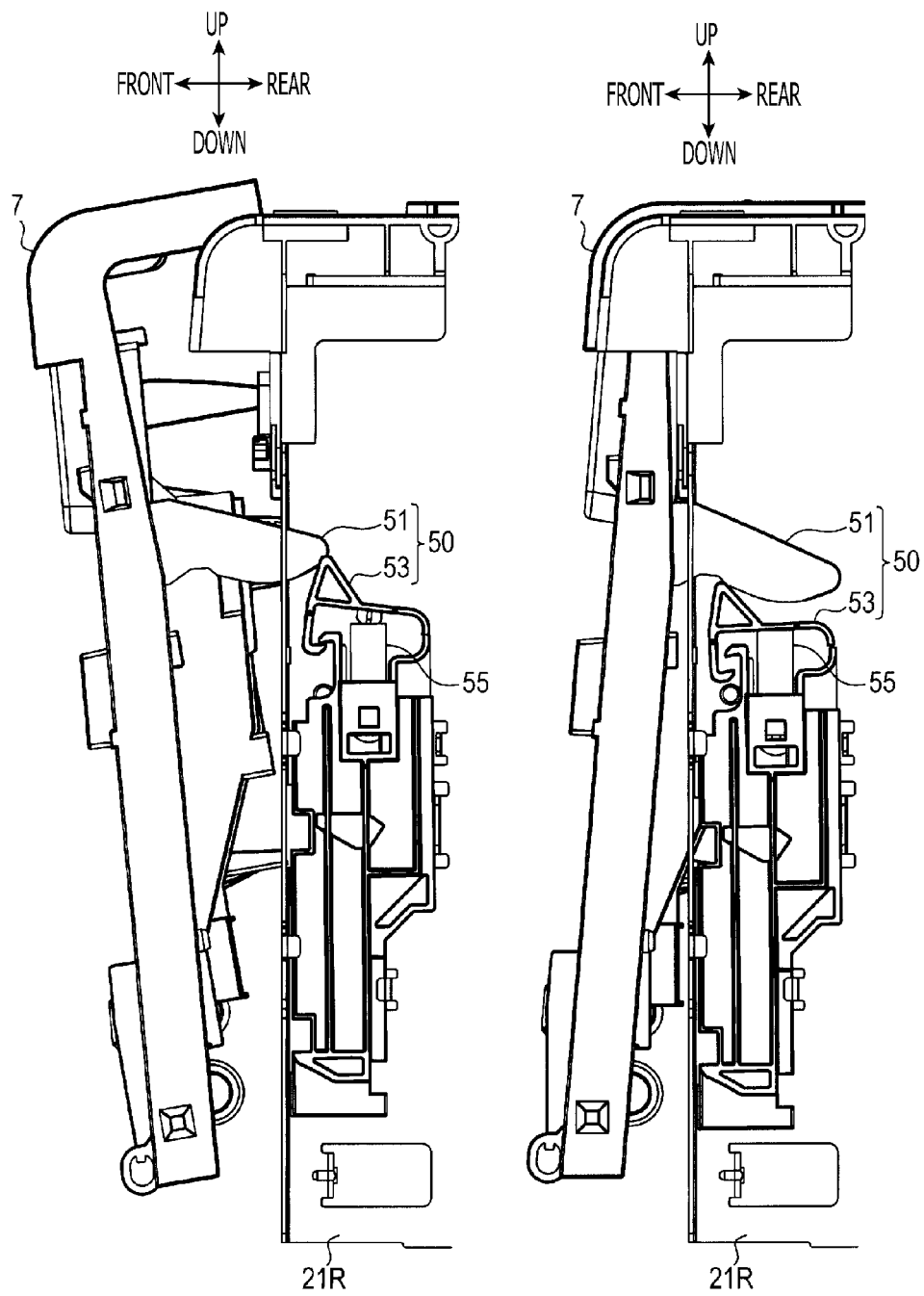

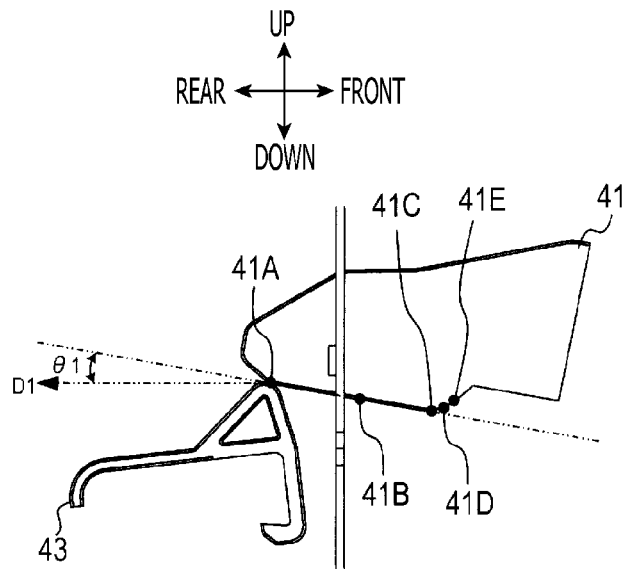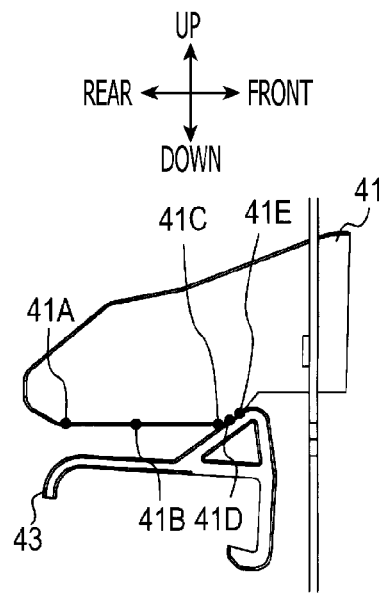
FIG. 8A  FIG. 8B
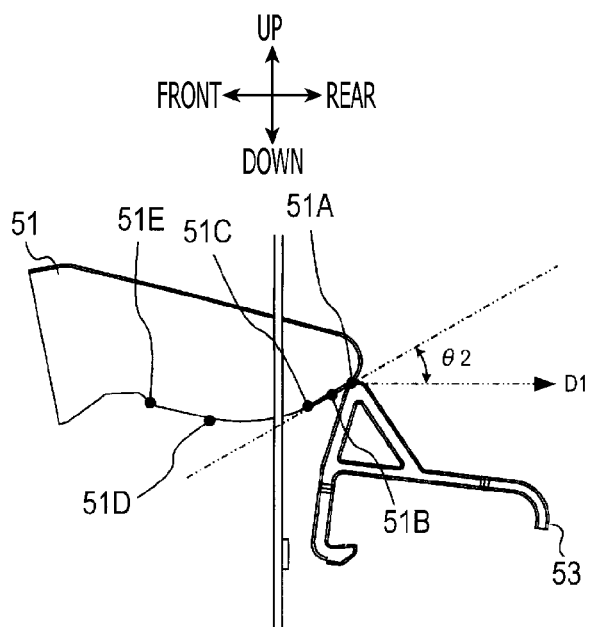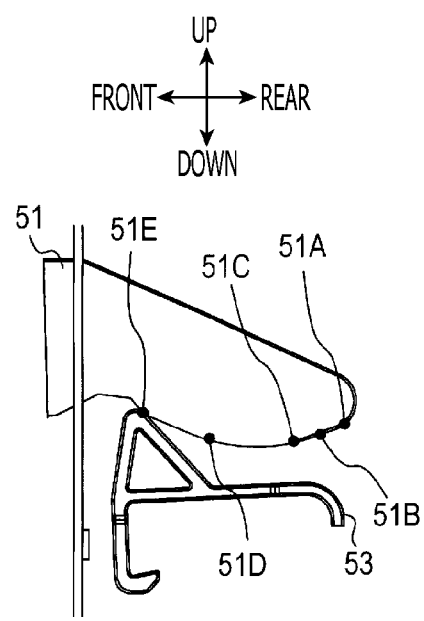
FIG. 8C  FIG. 8D

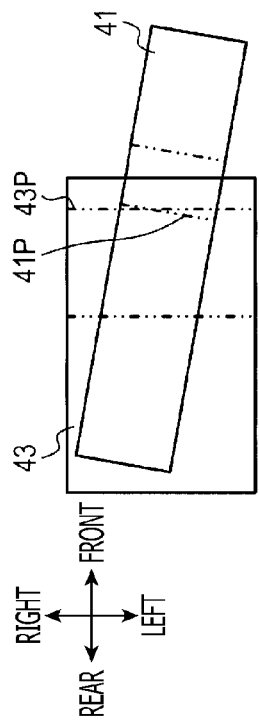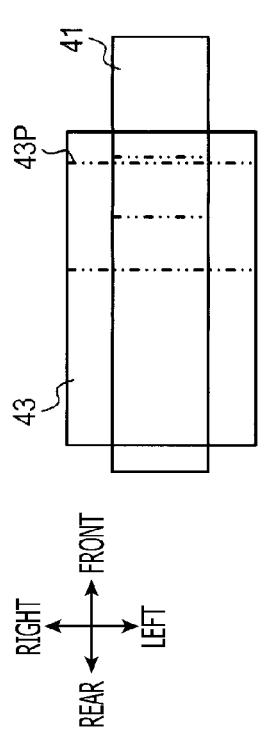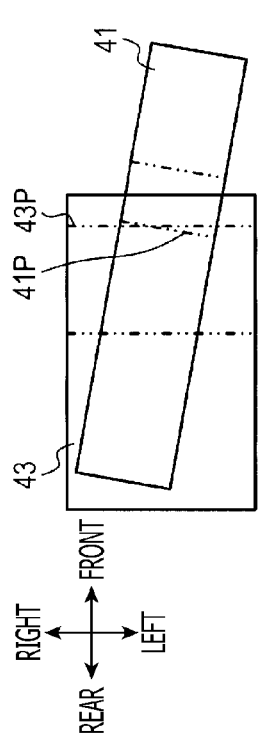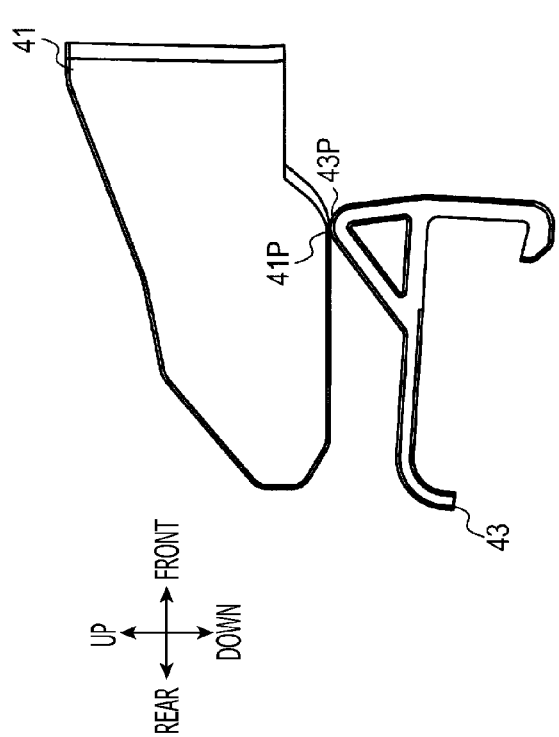

COVER OPENING AND CLOSING MECHANISM AND IMAGE PROCESSING DEVICE

CROSS-REFERENCE TO RELATED APPLICATION

This application claims priority under 35 U.S.C. §119 from Japanese Patent Application No. 2010-103811, filed on Apr. 28, 2010. The entire subject matter of the application is incorporated herein by reference.

BACKGROUND

1. Technical Field

Aspects of the present invention relate to a cover opening and closing mechanism configured to open and close a cover for covering an opening formed in a housing, and to an image processing device provided with such a cover opening and closing mechanism.

2. Related Art

Conventionally, an image forming device having a cover opening and closing mechanism capable of opening and closing a cover for covering an opening formed in a housing of the image forming device has been used. One of such image forming devices is provided with a pair of auxiliary locking mechanisms in addition to a pair of main locking mechanisms so that the cover is prevented from being closed in a one-sided closed state (i.e., a state where one of right and left sides of the cover is locked).

SUMMARY

However, there is a possibility that, if the degree of rigidity of the cover is low and the cover could be deformed when receiving an external force, a drawing force for drawing the cover toward a closed position is weakened and thereby the cover may be closed in a one-sided closed state.

If a sensor for detecting whether the cover is closed is located at a position shifted closer to one of the pair of locking mechanism with respect to the center of the pair of locking mechanisms, the sensor may erroneously detect the state of the cover.

Aspects of the present invention are advantageous in that they provide at least one a cover opening and closing mechanism and an image processing device configured to prevent a cover from being closed in a one-sided closed state, and to properly detect whether the cover is closed or opened even when a sensor for detecting the state of the cover is located as a position shifted closer to one of a pair of locking mechanisms.

According to an aspect of the invention, there is provided a cover opening and closing mechanism, comprising: a housing having an opening; a cover that is attached to the housing to be rotatable about a predetermined rotation axis so that the cover is movable between a closed position and an opened position, the cover being formed to have flexibility and to be deformed when receiving an external force; a first locking mechanism having a pair of members respectively provided at a first position on the cover and at a corresponding position on the housing, the pair of members of the first locking mechanism being brought to a locked state when the cover is in the closed position; and a second locking mechanism having a pair of members respectively provided at a second position on the cover and at a corresponding position on the housing, the pair of members of the second locking mechanism being brought to a locked state when the cover is in the closed position. In this configuration, a first distance by which the pair of members of the first locking mechanism slide and move with respect to each other in order to bring the first locking mechanism to the locked state is longer than a second distance by which the pair of members of the second locking mechanism slide and move with respect to each other in order to bring the second locking mechanism to the locked state. An external force for causing the pair of the members of the first locking mechanism to slide and move with respect to each other is weaker than an external force for causing the pair of members of the second locking mechanism to slide and move with respect to each other.

According to another aspect of the invention, there is provided an image processing device, comprising: an image processing unit; and the above described cover opening and closing mechanism.

BRIEF DESCRIPTION OF THE ACCOMPANYING DRAWINGS

FIG. 6A is a left side view illustrating a state where the cover is slightly moved from the closed position toward the opened position, and FIG. 6B is a left side view illustrating a state where the cover is in the closed position.

FIG. 7A is a right side view illustrating a state where the cover is moved slightly from the closed position toward the opened position, and FIG. 7B is a right side view illustrating a state where the cover is in the closed position.

FIG. 8A is a left side view illustrating a state where a stopper portion and a receiving portion of a first locking mechanism contact with each other, FIG. 8B is a left side view illustrating a state where the stopper portion and the receiving portion engage with each other, FIG. 8C is a right side view illustrating a state where an stopper portion and a receiving portion of a second locking mechanism contact with each other, and FIG. 8D is a right side view illustrating a state where the stopper portion and the receiving portion of the second locking mechanism engage with each other.

Figure 9:
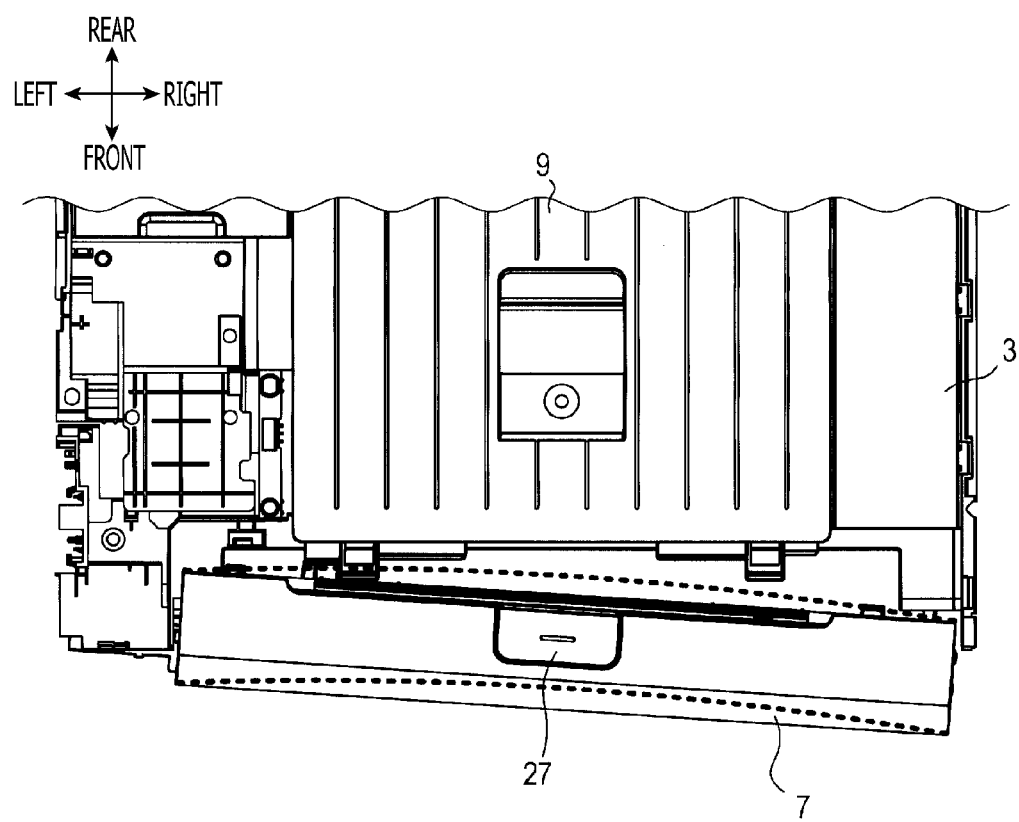

FIG. 9 is an explanatory illustration for explaining deformation of a cover caused when a left edge part of the cover is pressed.

FIG. 10A is a plan view illustrating a state where the stopper portion properly engages with the receiving portion, FIG. 10B is a left side view illustrating a state where the stopper portion properly engages with the receiving portion, FIG. 10C is a plan view illustrating a state where the stopper portion is not able to engage with the receiving portion, and FIG. 10D is a left side view illustrating a state where the stopper portion is not able to engage with the receiving portion.

DETAILED DESCRIPTION

Hereafter, an embodiment according to the invention will be described with reference to the accompanying drawings. In the following, positional relationships between components are explained while referring to upward, downward, leftward and rightward directions indicated in the drawings.

Figure 1:
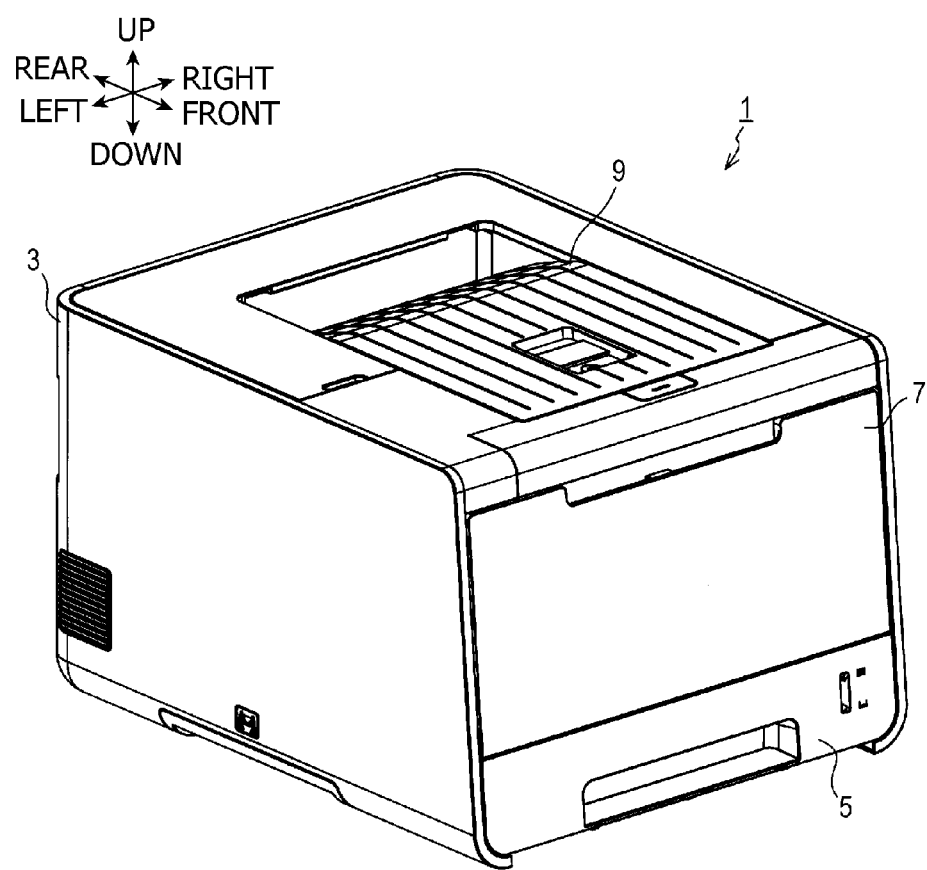
FIG. 1 is a perspective view illustrating an outer appearance of an image forming device according to an embodiment.

As shown in FIG. 1, an image forming device 1 includes a pullout paper cassette 5 at a lower front part of a housing 3. On the front side of the housing 3, a cover 7 is provided above the paper cassette 5. The cover 7 is attached to the housing 3 to be rotatable about an axis situated at a lower side of the cover 7 so that an upper side of the cover 7 can be inclined frontward with respect to the axis. On the top surface of the housing 3, an output tray 9 to which a recording medium on which an image has been formed is ejected is provided.

Figure 2:
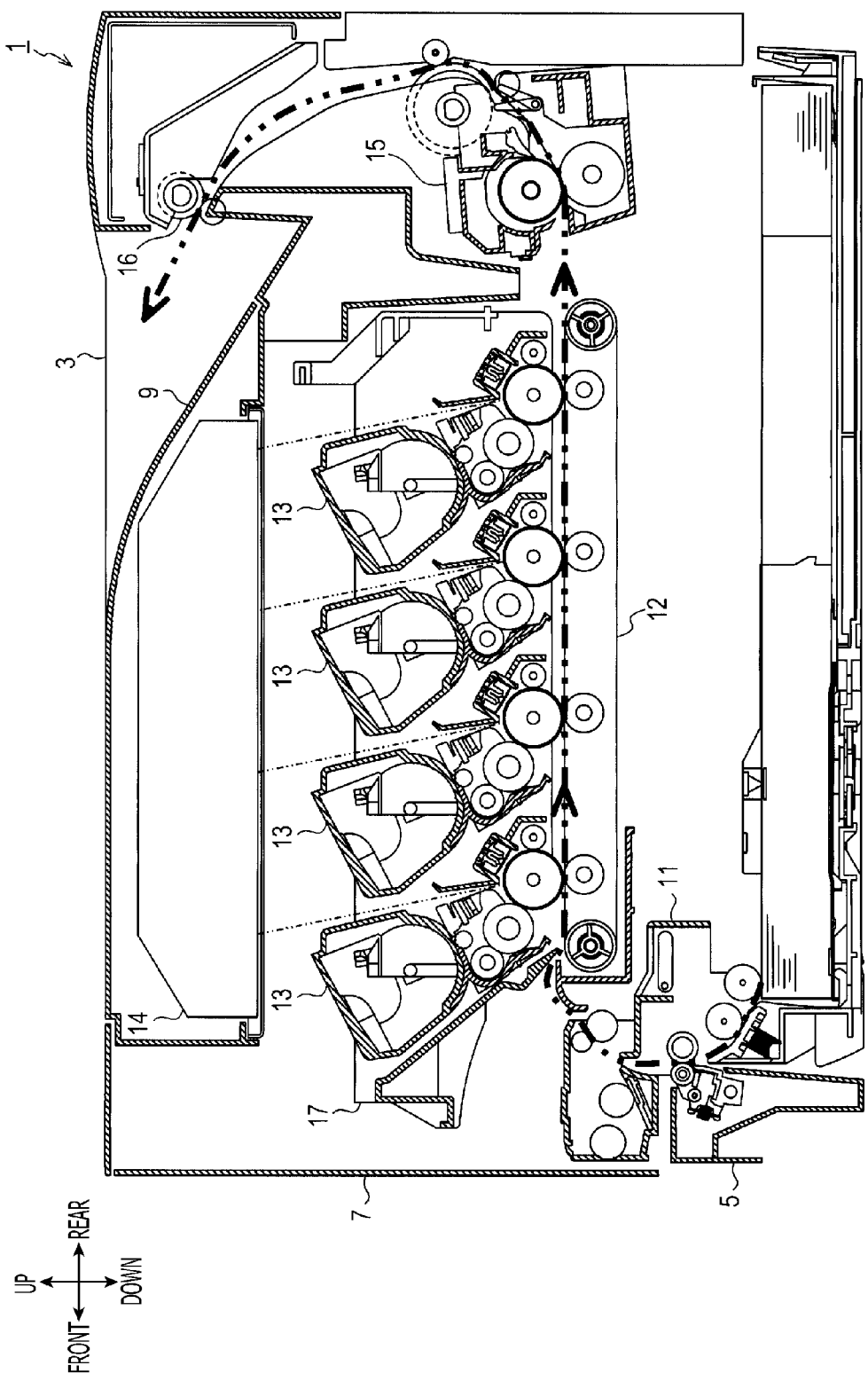
FIG. 2 is a vertical cross section illustrating an inner structure of the image forming device.

As shown in FIG. 2, the image forming device 1 is formed as a device having a tandem type image formation unit capable of forming an image through an electrophotographic process. The image forming device 1 includes a paper supply unit 11, a belt unit 12, process cartridges 13, a scanning unit 14, a fixing unit 15, an ejection unit 16 and a drawer 17.

The paper supply unit 11 sends out a sheet-like recording medium (e.g., a sheet of paper) accommodated in the paper cassette 5 toward the downstream side along a paper carrying path (indicated by a double chain line in FIG. 2).

The belt unit 12 carries the recording medium sent out by the paper supply unit 11 from the front side to the rear side while sandwiching the recording medium between the belt unit 12 and the process cartridges 13. The four process cartridges 13 are arranged in equal intervals above the belt unit 12. Each process cartridge 13 includes a photosensitive body and a developing mechanism which develops an electrostatic latent image formed on the photosensitive body.

The scanning unit 14 emits a laser beam toward the photosensitive body of each process cartridge 13 so as to form an electrostatic latent image on the photosensitive body. Then, the electrostatic latent image formed on the photosensitive body by the scanning unit 14 is developed as a toner image by the developing mechanism provided in the process cartridge 13. Next, the toner image is transferred to the recording medium being carried on the belt unit 13.

The fixing unit 15 fixes the toner image on the recording medium by heating and pressing the recoding medium on which the toner image has been transferred, while sandwiching the recording medium between rollers. The recording medium which has passed the fixing unit 15 is then ejected to the output tray 9 through the ejection unit 16.

The drawer 17 is configured such that the drawer 17 can be pulled out toward the front side in a state where the cover 7 is opened. On the drawer 17, the process cartridges 13 are mounted so that the process cartridges 13 can be changed by pulling out the drawer 17.

Figure 3A:
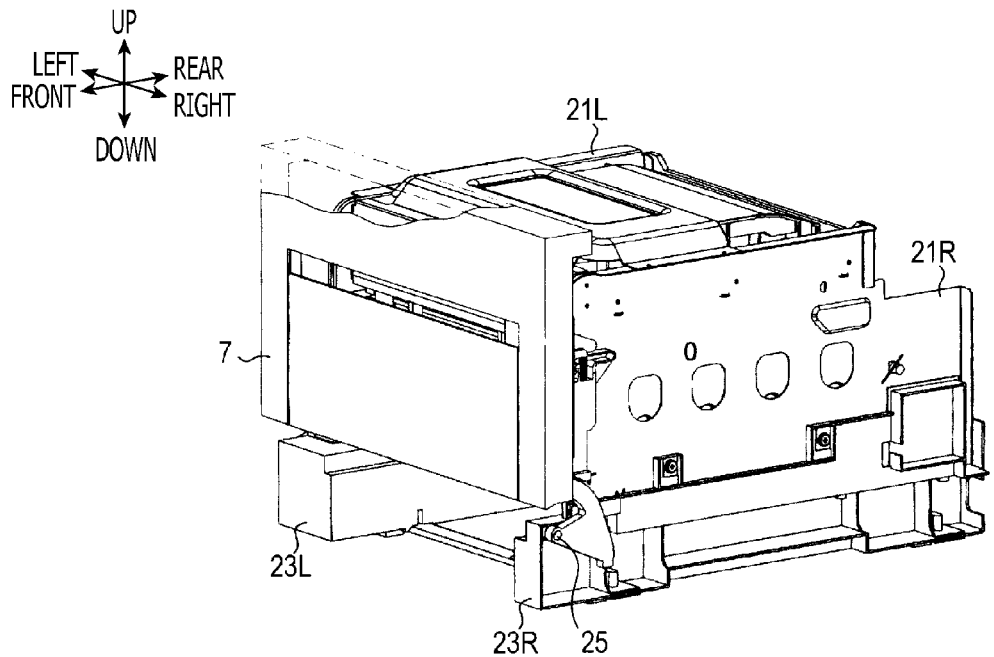
FIG. 3A is a perspective view illustrating a state where a cover is in a closed position.
Figure 3B:
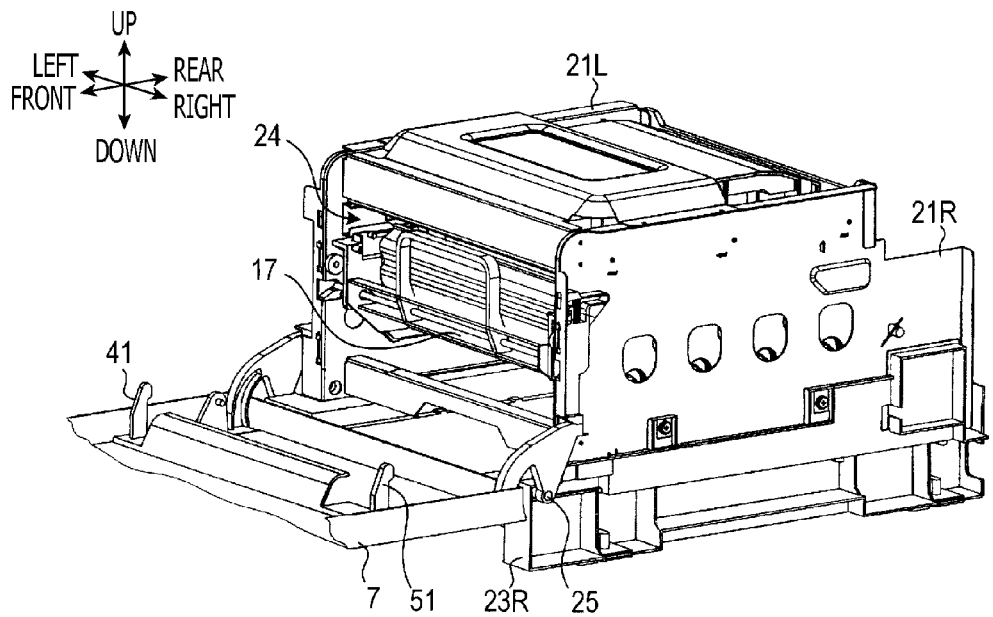
FIG. 3B is a perspective view illustrating a state where the cover is in an opened position.

The image forming device 1 includes upper frames 21L and 21R and lower frames 23L and 23R which serve as a framework for supporting the above described various components in the image forming device 1 (see FIGS. 3A and 3B). Each of the upper frames 21L and 21R is a member made of sheet metal. The upper frames 21L and 21R are arranged to have a certain interval in the left and right direction so that the upper frames 21L and 21R are located above the lower frames 23L and 23R, respectively. Each of the lower frames 23L and 23R is a member made of resin of which rigidity is lower than the upper frames 21L and 21R.

The paper supply unit 11, the belt unit 12, the process cartridges 13, the scanning unit 14, the fixing unit 15, the ejection unit 16 and the drawer 17 are accommodated in the inside between the upper frames 21L and 21R. The paper cassette 5 is accommodated in the inside between the lower frames 23L and 23R.

At the front edge parts of the lower frames 23L and 23R, the cover 7 is attached. The cover 7 is arranged such that the cover 7 can be inclined between a closed position (see FIG. 3A) and an opened position (see FIG. 3B) by rotating about a rotation shaft 25 which is parallel with the upper edge or the lower edge of an opening 24 formed on the front side of the housing 3. By rotating the cover 7 to the opened position, it becomes possible to pull out the drawer 17 through the opening 24. It should be noted that the rotation shaft 25 may not be completely parallel with the upper edge or the lower edge of the opening 24. For example, the rotation shaft 25 may be slightly inclined with respect to the upper edge or the lower edge of the opening 24. That is, the rotation shaft 25 may be arranged to be substantially parallel with the upper edge or the lower edge of the opening 24.

Figure 4A:
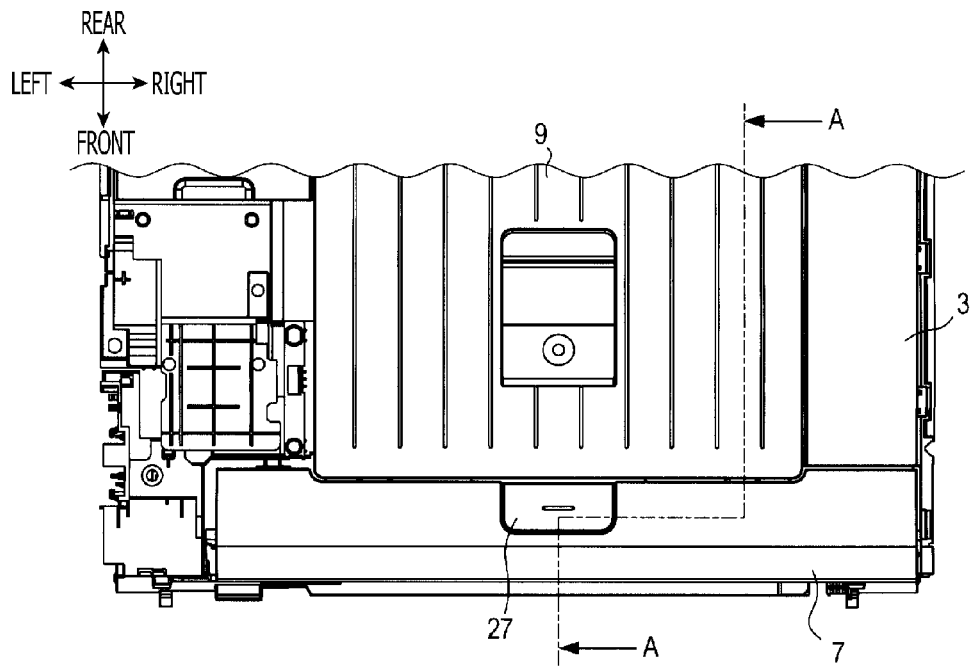
FIG. 4A is a plan view illustrating a state where the cover is in the closed position.
Figure 4B:
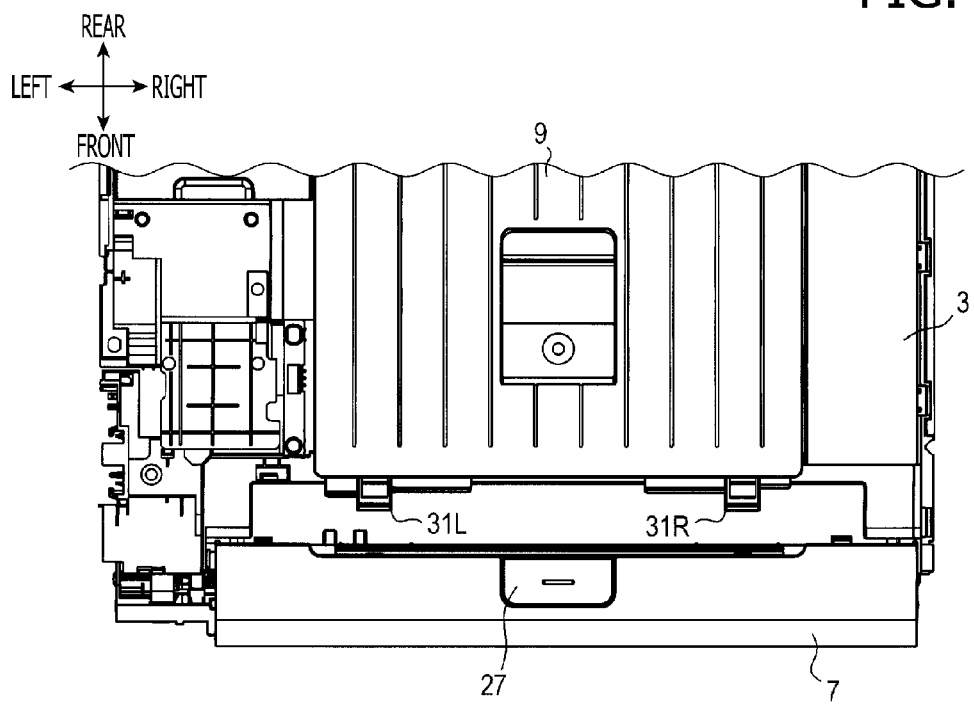
FIG. 4B is a plan view illustrating a state where the cover is slightly moved from the closed position toward the opened position.

As shown in FIGS. 4A and 4B, a push button 27 is provided at the upper edge portion of the cover 7. The push button 27 is pressed by a user to open the cover 7.

Figure 5A:
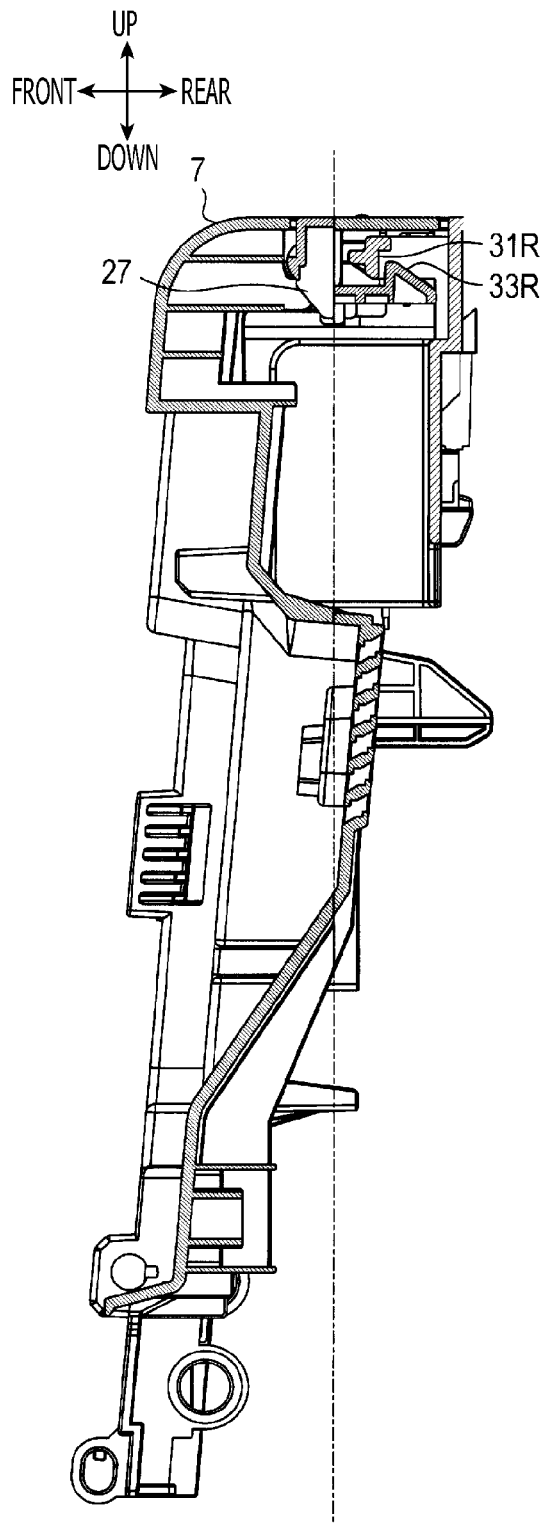
FIG. 5A is a cross section illustrating a state where a hook engages with a receiving portion.

More specifically, as shown in FIGS. 4B and 5A, in a main body of the image forming device 1, receiving portions 31L and 31R are provided. On the cover 7, hooks 33L and 33R are provided at positions respectively corresponding to the positions of the receiving portions 31L and 31R (In FIG. 5A, the hook 33R is shown).

In a state where the cover 7 is closed, the hooks 33L and 33R engage with the receiving portions 31L and 31R, respectively, so that the cover 7 is prevented from moving toward the opened position. When the press button 27 is pressed, the hooks 33L and 33R rotate in accordance with movement of the press button 27.

Figure 5B:
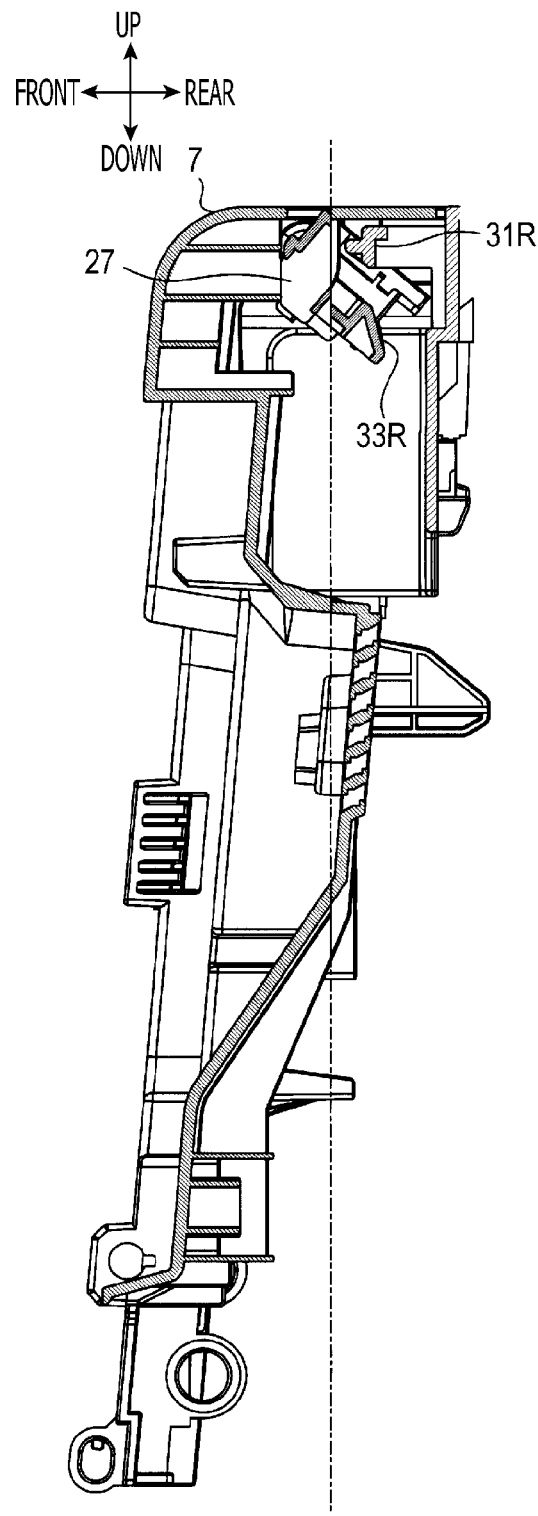
FIG. 5B is a cross section illustrating a state where the hook is released from the receiving portion.

Therefore, when the hooks 33L and 33R are rotated together with the movement of the press button 27, engagement between the hooks 33L and 33R and the receiving portions 31L and 31R are released as shown in FIG. 5B. By pulling the cover 7 frontward in a sate where the engagement between the hooks 33L and 33R and the receiving portions 31L and 31R is released, the cover 7 can be opened.

As shown in FIG. 6A, a first locking mechanism 40 is provided on a left side of the front surface of the image forming device 1. The first locking mechanism 40 includes a stopper portion 41 provided on the cover 7, and a receiving portion 43 provided on a left surface of the upper frame 21L. The receiving portion 43 is in a state of being pressed upward by an elastic force from a compression spring 45.

As shown in FIG. 6B, in a state where the cover 7 is in the closed position, the stopper portion 41 and the receiving portion 43 lock with respect to each other, so that the cover 7 is prevented from moving toward the opened position.

In the vicinity of the first locking mechanism 40, a limit switch 47 is provided. When the cover 7 moves from the opened position to the closed position, a projection 49 which is formed on the cover 7 to protrude from the cover 7 contacts a lever 47A, and thereby the limit switch 47 switches from ON to OFF.

On the other hand, when the cover 7 moves from the closed position to the opened position, the projection 49 moves away from the lever 47A, and thereby the limit switch 47 switches from OFF to ON. Therefore, it is possible to detect whether the cover 7 is in the closed position in accordance with whether the limit switch 47 is ON or OFF.

As shown in FIG. 7A, a second locking mechanism 50 is provided on a right side of the front surface of the image forming device 1. The second locking mechanism 50 is similar to the configuration of the first locking mechanism 40. The second locking mechanism 50 includes a stopper portion 51 provided on the cover 7, and a receiving portion 53 provided on a left surface of the upper frame 21R. The receiving portion 53 is in a state of being pressed upward by an elastic force from a compression spring 55.

As shown in FIG. 7B, in a state where the cover 7 is in the closed position, the stopper portion 51 and the receiving portion 53 lock with respect to each other, so that the cover 7 is prevented from moving toward the opened position.

However, the stopper portion 51 of the second locking mechanism 50 is formed to be slightly different from the stopper portion 41 of the first locking mechanism 40. Due to such a difference in shape between the stopper portion 51 and the stopper portion 41, the second locking mechanism 50 requires a stronger force for bringing the stopper portion 51 to the state of being locked with the receiving portion 53 than a force for bringing the stopper portion 41 to the state of being locked with the receiving portion 43.

More specifically, as shown in FIG. 8A, when the cover 7 moves from the opened position to the closed position, the stopper portion 41 of the first locking mechanism 40 first moves in a traveling direction D1 (which is substantially horizontal when the stopper portion 41 contacts the receiving portion 43), and contacts the receiving portion 43 at a contact start point 41A.

Then, as the stopper portion 41 moves further in the traveling direction D1, the stopper portion 41 and the receiving portion 43 slide with respect to each other while keeping the state of contacting with each other. As a result, a contacting point defined on the receiving portion 43 between the stopper portion 41 and the receiving portion 43 moves along a first guide surface 41B from the contact start point 41A to a peak point 41C.

Next, as the stopper portion 41 moves further in the traveling direction D1, the stopper portion 41 and the receiving portion 43 slide with respect to each other while keeping the state of contacting with each other. As a result, the contacting point defined on the receiving portion 43 between the stopper portion 41 and the receiving portion 43 passes over the peak point 41C, and further moves along a second guide surface 41D from the peak point 41C to an engagement completion point 41E. When the contacting point between the stopper portion 41 and the receiving portion 43 reaches the engagement completion point 41E, the stopper portion 41 and the receiving portion 43 are brought to the locked state.

Regarding the stopper portion 41, the first guide surface 41B is formed such that an angle θ1 formed between the first guide surface 41B and the traveling direction D1 (which is substantially horizontal when the stopper portion 41 contacts the receiving portion 43) is relatively small. Therefore, when a force for moving the stopper portion 41 in the traveling direction D1 is divided into an component force which is horizontal with respect to the first guide surface 41B and a component force which is perpendicular to the first guide surface 41B, almost all of the force acts as the component force which is horizontal with the first guide surface 41B, and therefore the component force which is horizontal with the first guide surface 41B causes the stopper portion 41 to slide along the first guide surface 41B.

On the other hand, as shown in FIG. 8C, when the cover 7 moves from the opened position to the closed position, the stopper portion 51 of the second locking mechanism 50 first moves in the traveling direction D1 (which is substantially horizontal when the stopper portion 51 contacts the receiving portion 53), and contacts the receiving portion 53 at a contact start point 51A.

Then, as the stopper portion 51 moves further in the traveling direction D1, the stopper portion 51 and the receiving portion 53 slide with respect to each other while keeping the state of contacting with each other. As a result, a contacting point defined on the receiving portion 53 between the stopper portion 51 and the receiving portion 53 moves along a first guide surface 51B from the contact start point 51A to a peak point 51C.

Next, as the stopper portion 51 moves further in the traveling direction D1, the stopper portion 51 and the receiving portion 53 slide with respect to each other while keeping the state of contacting with each other. As a result, the contacting point defined on the receiving portion 53 between the stopper portion 51 and the receiving portion 53 passes over the peak point 51C, and further moves along a second guide surface 51D from the peak point 51C to an engagement completion point 51E. When the contacting point between the stopper portion 51 and the receiving portion 53 reaches the engagement completion point 51E, the stopper portion 51 and the receiving portion 53 are brought to the locked state.

Regarding the stopper portion 51, the first guide surface 51B is formed such that an angle θ2 formed between the first guide surface 51B and the traveling direction D1 (which is substantially horizontal when the stopper portion 51 contacts the receiving portion 53) is larger than the angle θ1.

Therefore, when a force for moving the stopper portion 51 in the traveling direction D1 is divided into a component force which is parallel with the first guide surface 51B and a component force which is perpendicular to the first guide surface 5r1B, the component force which is parallel with the first guide surface 51B becomes smaller than the component force acting in parallel with the first guide surface 41B in the case of the stopper portion 41.

Therefore, the force for causing the stopper portion 51 to slide along the first guide surface 51B is weaker than the force for causing the stopper portion 41 to slide along the first guide surface 41B. In addition, since the component force which is perpendicular to the first guide surface 51B becomes larger than the component force which is perpendicular to the first guide surface 41B in the case of the stopper portion 41, the stopper portion 51 is pressed against the first guide surface 51B more strongly in comparison with the case where the stopper portion 41 is pressed against the first guide surface 41B. That is, a frictional resistance acting between the stopper portion 51 and the first guide surface 51B becomes larger than a frictional resistance acting between the stopper portion 41 and the first guide surface 41B.

Therefore, in the state where the stopper portions 41 and 51 respectively contact the receiving portions 43 and 53, the stopper portion 41 can be pushed toward the closed position with a force which is weaker than that for pushing the stopper portion 51 toward the closed position. In other words, in order to bring the second locking mechanism 50 into a locked state, it is necessary to apply, to the first locking mechanism 50, a stronger external force than an external force for bringing the first locking mechanism 40 into a locked state.

The stopper portion 51 is formed such that a distance between the contact start point 51A and the peak pint 51C is shorter than a distance between the contact start point 41A and the peak point 41C in the case of the stopper portion 41. Therefore, the stopper portion 51 can be moved such that the contacting point defined on the receiving portion 53 passes over the peak point 51C and reaches the second guide surface 51D without the need for pressing the stopper portion 51 to a relatively deep position, although, in order to bring the second locking mechanism 50 to the locked state, it is necessary to apply, to the second locking mechanism 50, a stronger force than a force for bringing the first locking mechanism 40 to the locked state.

Regarding the stopper portion 51, the inclination of the second guide surface 51D is defined such that a pressing force acting on the stopper portion 51 when the stopper portion 51 is pressed upward from the receiving portion 53 also acts as a drawing force for drawing the stopper portion 51 toward the closed position. Therefore, when the stopper portion 51 is pressed toward the closed position, the cover 7 can be drawn to the closed position without applying a strong force to the stopper portion 51 after the contacting point between the stopper portion 51 and the receiving portion 53 passes over the peak point 51C.

In this point of view, regarding the stopper portion 41, the distance between the contact start point 41A and the peak point 41C is longer than the distance between the contact start point 51A to the peak point 51C. Therefore, it is necessary to press the stopper portion 41 to a relatively deep point in order to cause the receiving portion 43 to pass over the peak point 41C. In other words, if the stopper portion 41 is not pressed to a relatively deep point, the first locking mechanism 40 cannot be brought to the locked state.

Furthermore, after the contacting point between the stopper portion 41 and the receiving portion 43 passes over the peak point 41C, the contacting point between the stopper portion 41 and the receiving portion 43 reaches the engagement completion point 41E by slightly pressing the stopper portion 41. For this reason, the drawing force for drawing the stopper portion 41 toward the closed position is not so strong as that for drawing the stopper portion 51 toward the closed position.

That is, although initially the stopper portion 41 can be pushed easily in comparison with the stopper portion 51, the stopper portion 41 is not drawn strongly toward the closed position in comparison with the case of the stopper portion 51. On the other hand, initially the stopper portion 51 is hard to push toward the closed position, but afterward the stopper portion 51 becomes easier to be drawn to the closed position in comparison with case of the stopper portion 41.

In addition, the cover 7 is configured such that the flexural rigidity in the left and right direction is relatively low. Therefore, in a state where the stopper portion 41 is easily to push and the stopper portion 51 is hard to push, the cover 7 deforms, for example, when the cover 7 is moved to the closed position by pressing the left edge portion of the cover 7. In this case, the cover 7 deforms as indicated by a dashed line in FIG. 9.

If the cover 7 deforms as described above, an elastic restoring force is caused in the cover 7 depending on the elastic deformation of the cover 7. The elastic restoring force acts in a direction of drawing back the stopper portion 41 from the closed position side. Therefore, through the elastic restoring force, it becomes possible to prevent the cover 7 from being closed in the one-sided closed state (i.e., a state where one side of the cover 7 is closed).

Furthermore, as shown in FIGS. 10A and 10B, regarding the stopper portion 41 and the receiving portion 43, when the stopper portion 41 moves straight in the proper traveling direction D1, a peak part 41P of the stopper portion 41 and a peak part 43P of the receiving portion 43 become parallel with each other, and in this case the stopper portion 41 and the receiving portion 43 engage with each other after the peak parts 41P and 43P clime over with respect to each other.

By contrast, as shown in FIGS. 10C and 10D, when the stopper portion 41 moves in an inclined direction D2 (improper direction) with respect to the proper traveling direction D1, the peak parts 41P and 43P become to a state where the peak parts 41P and 43P are not parallel with each other. In this case, the peak parts 41P and 43P become unable to pass over with respect to each other. As a result, the stopper portion 41 and the receiving portion 43 cannot be moved to the position where the stopper portion 41 and the receiving portion 43 engage with each other. Such a configuration of the stopper portion 41 also contributes to preventing the cover 7 from being closed in the one-sided closed state in the first locking mechanism 40.

Hereafter, advantages achieved by the above described embodiment will be explained. As described above, the cover 7 is configured such that the cover 7 is deformed when receiving an external force. Therefore, there may be a case where an upper right part of the cover 7 cannot reach the closed position regardless of the fact that an upper left part of the cover 7 reaches a position near to the closed position. However, even when such a condition occurs, by the elastic restoring force of the cover 7, the first locking mechanism 40 can be prevented from being brought to the locked state.

Therefore, by employing such a configuration which utilizes the elastic restoring force for preventing occurrence of the state where the cover 7 is closed in the one-sided closed state, it becomes possible to prevent occurrence of a situation where only the first locking mechanism 40 is in the closed state, thereby ensuring that both of the first locking mechanism 40 and the second locking mechanism 50 are in the locked state.

Therefore, for the limit switch 47, it is not necessary to detect whether the cover 7 is at a position where both of the first locking mechanism 40 and the second locking mechanism 50 are in the locked state. Such a configuration makes it possible to simplify the configuration of a detecting unit which is not required to detect whether the cover 7 is at a position where both of the first locking mechanism 40 and the second locking mechanism 50 are in the locked state, in comparison with the case where a detecting unit is required to detect whether the cover 7 is at a position where both of the first locking mechanism 40 and the second locking mechanism 50.

That is, even if the detecting unit is formed by a single limit switch 47, it becomes possible to prevent the detecting unit from erroneously detecting that the cover 7 is in the closed state in the situation where only the first locking mechanism 40 is in the locked state while the second locking mechanism 50 is not in the locked state.

Although the present invention has been described in considerable detail with reference to certain preferred embodiments thereof, other embodiments are possible.

Hereafter, variations of the above described embodiment will described.

In the image forming device according to the above described embodiment, when the cover 7 is opened by pressing the push button 27, the force for releasing the locked state of the first locking mechanism and the force for releasing the locked state of the second locking mechanism are different from each other. Therefore, the first locking mechanism 40 tends to be released from the locked state more easily relative to the second locking mechanism 50. If the cover 7 is opened in an inclined state, the user may have uncomfortable feel.

Therefore, in order to suppress such uncomfortable feeling, the push button 27 may be located at a rightward position in accordance with the difference of the force for locking the first locking mechanism 50 and the force for locking the second locking mechanism 50. Such a configuration makes it possible to prevent the cover 7 from being opened in an inclined state. In other words, the push button 27 may be located at a position shifted in some degree from the center in the left and right direction between the first and second locking mechanisms 40 and 50.

In the above described embodiment, the image forming device 1 is described as an example of an image forming device configured to form an image through an electrophotographic process and to have a housing in which an opening is formed. However, the feature of the above described embodiment may be applied to various types of image processing devices, such as an image reading device provided with, in a housing, a reading unit configured to read an image from a document, and a multifunction-type image processing device provided with both of a reading unit and an image formation unit in a housing.

What is claimed is:

1. A cover opening and closing mechanism, comprising:
    a housing comprising an opening;
    a cover that is attached to the housing to be rotatable about a predetermined rotation axis so that the cover is movable between a closed position and an opened position, the cover being formed to have flexibility and to be deformable when receiving an external force;
    a first locking mechanism comprising a pair of members respectively provided at a first position on the cover and at a corresponding position on the housing, the pair of members of the first locking mechanism being brought to a locked state when the cover is in the closed position; and
        a second locking mechanism comprising a pair of members respectively provided at a second position on the cover and at a corresponding position on the housing, the pair of members of the second locking mechanism being brought to a locked state when the cover is in the closed position,
    wherein a first distance by which the pair of members of the first locking mechanism slide and move with respect to each other in order to bring the first locking mechanism to the locked state is longer than a second distance by which the pair of members of the second locking mechanism slide and move with respect to each other in order to bring the second locking mechanism to the locked state, and
    wherein an external force required to cause the pair of the members of the first locking mechanism to slide and move with respect to each other is weaker than an external force required to cause the pair of members of the second locking mechanism to slide and move with respect to each other.

2. The cover opening and closing mechanism according to claim 1,
    wherein:
    at least one of the pair of members of the first locking mechanism is provided with a first guide surface along which the pair of members of the first locking mechanism slide and move with respect to each other;
    at least one of the pair of members of the second locking mechanism is provided with a second guide surface along which the pair of members of the second locking mechanism slide and move with respect to each other; and
    a first angle formed by the first guide surface with respect to a direction in which the pair of members of the first locking mechanism move with respect to each other when the pair of members of the first locking mechanism contact with each other is smaller than a second angle formed by the second guide surface with respect to a direction in which the pair of members of the second locking mechanism move with respect to each other when the pair of members of the second locking mechanism contact with each other.

3. The cover opening and closing mechanism according to claim 1,
    wherein:
    the cover is elastically deformable when receiving an external force acting such that the first locking mechanism is brought to the locked state in a condition where the second locking mechanism is not in the locked state; and
    the cover is configured to produce an elastic restoring force when the cover is elastically deformed, the elastic restoring force acting to prevent the first locking mechanism from being brought to the locked state in the condition where the second locking mechanism is not in the locked state.

4. The cover opening and closing mechanism according to claim 1,
    wherein:
    the pair of members of the first locking mechanism includes a first stopper portion provided at one of the first position on the cover and the corresponding position on the housing and a first receiving portion provided at the other of the first position on the cover and the corresponding position on the housing;
    when the cover is moved to the closed position, the first stopper portion and the first receiving portion move with respect to each other in a first direction and contact with each other, and then move with respect to each other in a second direction by the first distance, and thereafter the first stopper portion and the first receiving portion are brought to the locked state after passing over, with respect to each other, a peak part formed on at least one of the first stopper portion and the first receiving portion;
    the pair of members of the second locking mechanism includes a second stopper portion provided at one of the second position on the cover and the corresponding position on the housing and a second receiving portion provided at the other of the second position on the cover and the corresponding position on the housing;
    when the cover is moved to the closed position, the second stopper portion and the second receiving portion move with respect to each other in a third direction and contact with each other, and then move with respect to each other in a fourth direction by the second distance, and thereafter the second stopper portion and the second receiving portion are brought to the locked state after passing over, with respect to each other, a peak part formed on at least one of the second stopper portion and the second receiving portion.

5. The cover opening and closing mechanism according to claim 4,
    wherein:
    the first stopper portion and the first receiving portion of the first locking mechanism are respectively provided with peak parts formed to be in parallel with each other,
    when the cover is moved in a direction of bringing the first locking mechanism to the locked state in a condition where the second locking mechanism is not in the locked state, the peak parts are brought from a state where the peak parts of the cover and the housing are parallel with each other to a state where the peak parts are not parallel with each other so that the first stopper portion and the first receiving portion are unable to pass over with respect to each other.

6. The cover opening and closing mechanism according to claim 4,
wherein:
the first stopper portion and the first receiving portion of the first locking mechanism are configured to be brought to the locked state after the first stopper portion and the first receiving portion pass over, with respect to each other, the peak part and then slide and move with respect to each other in a state of being in contact with each other;
in a state where the first stopper portion and the first receiving portion slide and move with respect to each other while being in contact with each other after the first stopper portion and the first receiving portion pass over the peak part with respect to each other, a first elastic restoring force is caused by an elastic deformation of at least one of the first stopper portion and the first receiving portion,
the second stopper portion and the second receiving portion of the second locking mechanism are configured to be brought to the locked state after the second stopper portion and the second receiving portion pass over, with respect to each other, the peak part and then slide and move with respect to each other while being in contact with each other;
in a state where the second stopper portion and the second receiving portion slide and move with respect to each other while being in contact with each other after the second stopper portion and the second receiving portion pass over the peak part with respect to each other, a second elastic restoring force is caused by an elastic deformation of at least one of the second stopper portion and the second receiving portion;
a force which is caused in accordance with the second elastic restoring force for bringing the second stopper portion and the second receiving portion to the locked state is stronger than a force which is caused in accordance with the first elastic restoring force for bringing the first stopper portion and the first receiving portion to the locked state.

7. The cover opening and closing mechanism according to claim 6,
wherein a distance by which the second stopper portion and the second receiving portion slide and move with respect to each other after passing over the peak part of at least one of the second stopper portion and the second receiving portion is longer than a distance by which the first stopper portion and the first receiving portion slide and move with respect to each other after passing over the peak part of at least one of the first stopper portion and the first receiving portion.

8. The cover opening and closing mechanism according to claim 1, further comprising:
a detection unit configured to detect whether the cover is in the closed position by detecting whether the cover has been moved to a position where the first locking mechanism is in the locked state.

9. An image processing device, comprising:
an image processing unit; and
a cover opening and closing mechanism,
the cover opening and closing mechanism comprising:
a housing comprising an opening;
a cover that is attached to the housing to be rotatable about a predetermined rotation axis so that the cover is movable between a closed position and an opened position, the cover being formed to have flexibility and to be deformable when receiving an external force;
a first locking mechanism comprising a pair of members respectively provided at a first position on the cover and at a corresponding position on the housing, the pair of members of the first locking mechanism being brought to a locked state when the cover is in the closed position; and
a second locking mechanism comprising a pair of members respectively provided at a second position on the cover and at a corresponding position on the housing, the pair of members of the second locking mechanism being brought to a locked state when the cover is in the closed position,
wherein a first distance by which the pair of members of the first locking mechanism slide and move with respect to each other in order to bring the first locking mechanism to the locked state is longer than a second distance by which the pair of members of the second locking mechanism slide and move with respect to each other in order to bring the second locking mechanism to the locked state, and
wherein an external force required to cause the pair of the members of the first locking mechanism to slide and move with respect to each other is weaker than an external force required to cause the pair of members of the second locking mechanism to slide and move with respect to each other.

10. The image processing device according to claim 9,
wherein:
at least one of the pair of members of the first locking mechanism is provided with a first guide surface along which the pair of members of the first locking mechanism slide and move with respect to each other;
at least one of the pair of members of the second locking mechanism is provided with a second guide surface along which the pair of members of the second locking mechanism slide and move with respect to each other; and
a first angle formed by the first guide surface with respect to a direction in which the pair of members of the first locking mechanism move with respect to each other when the pair of members of the first locking mechanism contact with each other is smaller than a second angle formed by the second guide surface with respect to a direction in which the pair of members of the second locking mechanism move with respect to each other when the pair of members of the second locking mechanism contact with each other.

11. The image processing device according to claim 9,
wherein:
the cover is elastically deformable when receiving an external force acting such that the first locking mechanism is brought to the locked state in a condition where the second locking mechanism is not in the locked state; and
the cover is configured to produce an elastic restoring force when the cover is elastically deformed, the elastic restoring force acting to prevent the first locking mechanism from being brought to the locked state in the condition where the second locking mechanism is not in the locked state.

12. The image processing device according to claim 9,
wherein:
the pair of members of the first locking mechanism includes a first stopper portion provided at one of the first position on the cover and the corresponding position on the housing and a first receiving portion provided at the other of the first position on the cover and the corresponding position on the housing;

when the cover is moved to the closed position, the first stopper portion and the first receiving portion move with respect to each other in a first direction and contact with each other, and then move with respect to each other in a second direction by the first distance, and thereafter the first stopper portion and the first receiving portion are brought to the locked state after passing over, with respect to each other, a peak part formed on at least one of the first stopper portion and the first receiving portion;

the pair of members of the second locking mechanism includes a second stopper portion provided at one of the second position on the cover and the corresponding position on the housing and a second receiving portion provided at the other of the second position on the cover and the corresponding position on the housing;

when the cover is moved to the closed position, the second stopper portion and the second receiving portion move with respect to each other in a third direction and contact with each other, and then move with respect to each other in a fourth direction by the second distance, and thereafter the second stopper portion and the second receiving portion are brought to the locked state after passing over, with respect to each other, a peak part formed on at least one of the second stopper portion and the second receiving portion.

13. The image processing device according to claim 12, wherein:

the first stopper portion and the first receiving portion of the first locking mechanism are respectively provided with peak parts formed to be in parallel with each other, when the cover is moved in a direction of bringing the first locking mechanism to the locked state in a condition where the second locking mechanism is not in the locked state, the peak parts are brought from a state where the peak parts of the cover and the housing are parallel with each other to a state where the peak parts are not parallel with each other so that the first stopper portion and the first receiving portion are unable to pass over with respect to each other.

14. The image processing device according to claim 12, wherein:

the first stopper portion and the first receiving portion of the first locking mechanism are configured to be brought to the locked state after the first stopper portion and the first receiving portion pass over, with respect to each other, the peak part and then slide and move with respect to each other while being in contact with each other;

in a state where the first stopper portion and the first receiving portion slide and move with respect to each other in the state of being in contact with each other after the first stopper portion and the first receiving portion pass over the peak part with respect to each other, a first elastic restoring force is caused by an elastic deformation of at least one of the first stopper portion and the first receiving portion, the second stopper portion and the second receiving portion of the second locking mechanism are configured to be brought to the locked state after the second stopper portion and the second receiving portion pass over, with respect to each other, the peak part and then slide and move with respect to each other while being in contact with each other;

in a state where the second stopper portion and the second receiving portion slide and move with respect to each other while being in contact with each other after the second stopper portion and the second receiving portion pass over the peak part with respect to each other, a second elastic restoring force is caused by an elastic deformation of at least one of the second stopper portion and the second receiving portion;

a force which is caused in accordance with the second elastic restoring force for bringing the second stopper portion and the second receiving portion to the locked state is stronger than a force which is caused in accordance with the first elastic restoring force for bringing the first stopper portion and the first receiving portion to the locked state.

15. The image processing device according to claim 14, wherein a distance by which the second stopper portion and the second receiving portion slide and move with respect to each other after passing over the peak part of at least one of the second stopper portion and the second receiving portion is longer than a distance by which the first stopper portion and the first receiving portion slide and move with respect to each other after passing over the peak part of at least one of the first stopper portion and the first receiving portion.

16. The image processing device according to claim 9, further comprising:

a detection unit configured to detect whether the cover is in the closed position by detecting whether the cover has been moved to a position where the first locking mechanism is in the locked state.

* * * * *